United States Patent [19]
Lord et al.

[11] Patent Number: 5,620,166
[45] Date of Patent: Apr. 15, 1997

[54] STEM AND NUT WITH BEARING FOR USE IN A MOTOR OPERATED VALVE

[76] Inventors: Bruce A. Lord, 652 Pinkham Brook Rd., Durham, Me. 04222; Chester F. Cynoski, 2 North St., North Walpole, N.H. 03609

[21] Appl. No.: 284,239

[22] Filed: Aug. 2, 1994

[51] Int. Cl.⁶ .............................. F16K 31/50; F16K 31/53
[52] U.S. Cl. ................... 251/267; 74/424.8 VA; 251/249.5; 251/129.12
[58] Field of Search ................ 74/89.15, 412 TA, 74/424.8 VA, 424.8 R; 251/129.11, 129.12, 266, 267, 248, 249.5

[56] References Cited

U.S. PATENT DOCUMENTS

| | | | |
|---|---|---|---|
| 695,838 | 3/1902 | Ritchie | 251/267 |
| 2,150,813 | 3/1939 | Ball | 74/424.8 VA |
| 2,222,699 | 11/1940 | Ball | 74/424.8 VA |
| 2,956,188 | 10/1960 | White | 74/424.8 VA |
| 3,738,183 | 6/1973 | Ball, Jr. et al. | 251/129.12 |
| 4,872,903 | 10/1989 | Periou | 74/89.15 |
| 5,144,851 | 9/1992 | Grimm et al. | 74/424.813 |
| 5,172,600 | 12/1992 | Cissell et al. | 74/89.15 |
| 5,187,992 | 2/1993 | Bald | 74/89.15 |
| 5,214,972 | 6/1993 | Larson | 74/89.15 |

*Primary Examiner*—George L. Walton

[57] ABSTRACT

A valve comprises a body for connecting to a pipe, the body having a passageway therethrough for communicating with the pipe; a member disposed within the passageway, the member being movable between open and closed positions for permitting and stopping flow through the pipe, respectively; a stem secured to the member; a nut operably secured to the stem, the nut being axially stationary relative to the stem and rotatable thereabout; an actuator for rotating the nut such that rotation of the nut causes the stem to move the member between the open and closed positions; a first bearing adapted to radially center the stem within the nut, the first bearing adapted to permit the stem to slide axially relative thereto; and a second bearing operably associated with the first bearing adapted to reduce rotational friction between the nut and the stem.

17 Claims, 4 Drawing Sheets

FIG_1

STEM AND NUT WITH BEARING FOR USE IN A MOTOR OPERATED VALVE

FIELD OF THE INVENTION

The present invention relates generally to a motor operated valve and specifically to a stem nut with bearing for use in a motor operated valve to minimize side loading.

BACKGROUND OF THE INVENTION

Repeated failures of motor operated valves (MOV) in nuclear power facilities to perform their intended safety functions brought about the issuance of NRC Generic Letter 89-10 (GL 89-10), requiring, among other things, that the facilities demonstrate their safety related MOV's to be operable by testing of the design basis differential pressure and/or flow by which the MOV's are required to perform their intended safety function.

Over the last several years, various manufacturers have developed diagnostic test equipment to assist the nuclear power facilities in quantifying the performance characteristics of MOV's. It soon became evident that valves often produce unpredicted and unexpected results that were in disagreement with the classical valve design equations of the past. In addition, a phenomenon termed "load sensitive behavior" (also known as "rate of loading") was often found to be a problem for MOV's that must close against flow. The root cause for this phenomenon has defied detection for years.

Load sensitive behavior is evidenced as a change in MOV performance between static conditions (no flow) and dynamic conditions (differential pressure and/or flow). The change in behavior is most often noticed as the difference in the thrust produced at a given torque switch setting in closing the valve during static versus dynamic conditions. The difference in thrust is easily detected with the use of modern diagnostic test equipment.

An MOV is usually set up during static conditions with the use of diagnostic test equipment. The valve is stroked, and the closed torque switch set point is set to receive the thrust expected to be required to close the valve disk, plus an additional amount of thrust for safety margin. In order to support GL 89-10 requirements, the MOV R is then stroked under dynamic conditions (flow) to demonstrate that it can perform its intended function.

After dynamic testing, the values of thrust and torque at torque switch trip may be easily compared. Many times, the thrust in the stem at torque switch trip during dynamic conditions is found to be less than the thrust that was observed during static conditions. However, the value of torque is the same. Sometimes the stem thrust under dynamic conditions is found to be greater than the thrust that was observed during static testing. Sets of "identical" MOVs have been found to have very different load sensitive behavior characteristics. Consequently, load sensitive behavior can have tremendous impact on the ability of an MOV to perform its intended safety function.

There is therefore a need for making an MOV behave predictably under static and dynamic conditions.

OBJECTS AND SUMMARY OF THE INVENTION

It is an object of the present invention to identify the problem of load sensitive behavior for motor operated valves and to provide a solution to the problem.

It is another object of the present invention to provide an MOV that will perform repeatedly under dynamic conditions, such as against flow, predictably and relatively reliably.

It is still another object of the present invention to provide an MOV where the torque applied to the stem nut is converted relatively efficiently to the production of thrust for moving the stem of the valve.

It is yet another object of the present invention to provide an MOV minimizes the effect of side loading to the stem of the valve.

It is an object of the present invention to provide an MOV where the stem is maintained substantially aligned with the center of the stem nut, thereby minimizing the effects of stem nut side loading.

In summary, the present invention provides a motor operated valve that will perform predictably and reliably under static and dynamic conditions.

These and other objects of the present invention will become apparent from the following description.

DETAILED DESCRIPTION OF THE INVENTION

Figure 1:
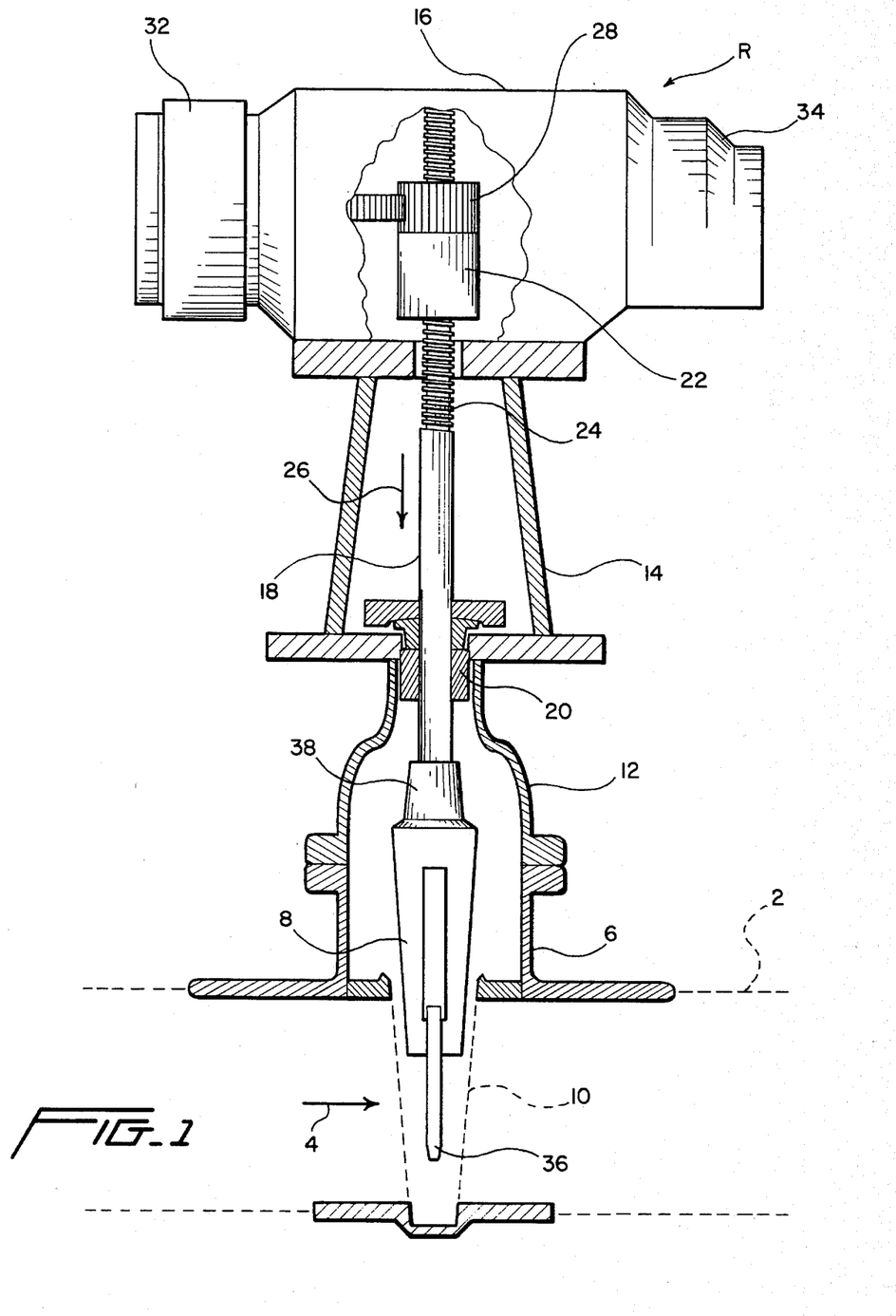
FIG. 1 is side elevational view of a motor operated valve, using the present invention, with portions shown in cross-section and broken away.

A motor operated valve R made in accordance with the present invention is disclosed in FIG. 1. The valve R is connected to a pipe 2 (shown in phantom line) for controlling process flow 4. The valve R comprises a body 6 enclosing a movable disk 8 for cooperating with a seat 10 when in the closed position, thereby to stop the process flow 4. A bonnet 12 is removably secured to the body 6. A yoke 14 is secured to the bonnet 12 and to an actuator 16 for driving its stem 18 connected to the disk 8, as best shown in FIG. 1. Packing 20 provides a seal between the valve bodies 6 and the yoke 14. A stem nut 22 is threaddedly engaged with the threads 24 of the stem 18 and is driven by the torque supplied by the actuator 16 to impart axial movement 26 to the stem 18, thereby to close the disk 8 across the process flow, as best shown in FIG. 1. The stem nut 22 includes keyways 28 or other conventional means to provide connection to a drive sleeve 30 (shown in FIG. 2) of the actuator 16.

The actuator 16 includes an electric motor 32 which is controlled by switches 34 that monitor and control the position of the disk 8. The switches 34 limit the amount of torque applied to the stem nut 22 under load. When the prescribed torque is exceeded, the switches 34 interrupt power to the motor 32. The switches 34 also perform as limit switches, interrupting power to the motor 32 when the prescribed position of the disk 8 is reached, either in the completely closed, completely opened, or intermediate position.

A guide rail 36 provides a guide for the disk 8 when moving toward the open and closed positions. A T-head connector 38 provides connection between the disk 8 and the stem 18.

Figure 2:
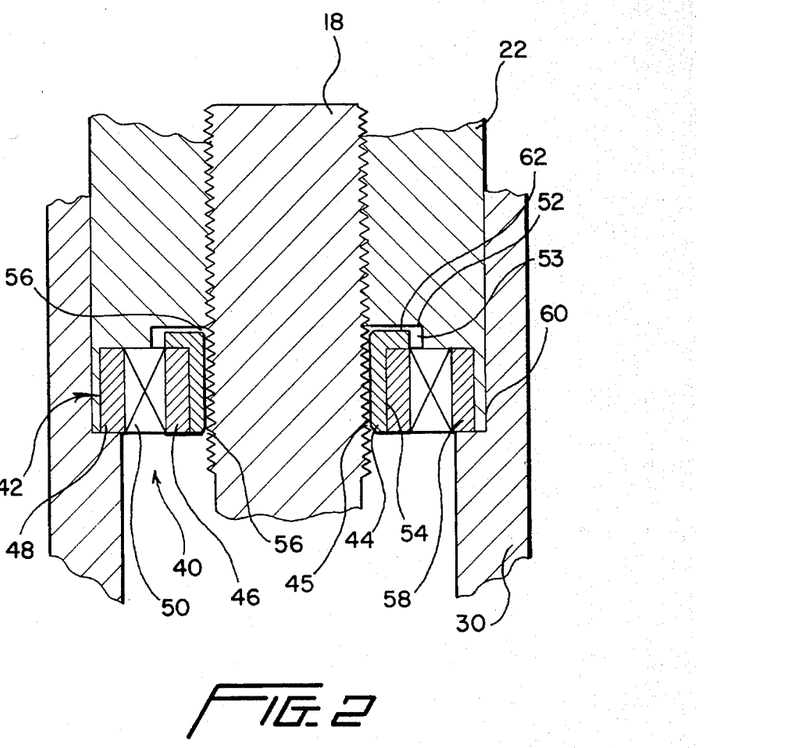
FIG. 2 is a fragmentary enlarged cross-sectional view of a stem and a stem nut using a bearing made in accordance with the present invention.

The stem 18 is centered within the stem nut 22 with a bearing assembly 40 made in accordance with the present invention, as best shown in FIG. 2. The bearing assembly 40 includes a conventional rotation or radial bearing 42 to accommodate loads at relatively higher rotational speed and an axial bearing 44 to accommodate load at relatively lower axial speed. The ball radial bearing 42 includes inner and outer races 46 and 48, respectively, with roller bearing 50 disposed therebetween. The axial bearing 44 comprises a sleeve or bushing 45, preferably made of bronze, press fit into and concentric with the center of the radial bearing 42.

The internal diameter of the axial bearing 44 advantageously provides sufficiently small clearance with the stem 18, such as equal to the nominal outside diameter of the stem 18 plus about 0.005 inch, to permit the stem 18 to pass freely in the axial direction but cannot deviate far from the center of stem 18. Gaps 52 and 53 are maintained between the axial bearing 44 and the stem nut 22 to advantageously avoid interfere or contact with the stem nut 22 and thereby prevent rotation of the axial bearing 44 and the inner race 46. The axial bearing 44 accommodates any axial movement of the stem 18.

The thickness of the axial bearing 44 along its longitudinal portion 54 is adapted to be sufficient to preclude binding as the stem threads 24 axially pass through. Chamfers 56 at the adjacent corners of the sleeve 45 are further provided to advantageously prevent binding with the external threads 24.

A recess 58 disposed in the bottom portion of the stem nut 22 holds the radial bearing 42. The recess 58 is concentric with the stem nut bore. The radial bearing 42 is preferably staked, press fit or otherwise fastened to the stem nut 22 or the drive sleeve 30 so that it rotates with the stem nut 22 and the drive sleeve 30 or any other rotating assembly (not shown) that holds the stem nut 22. A shoulder or shelf 60 in the drive sleeve 30 provides further support to the radial bearing 42, as best shown in FIG. 2.

Figure 3:
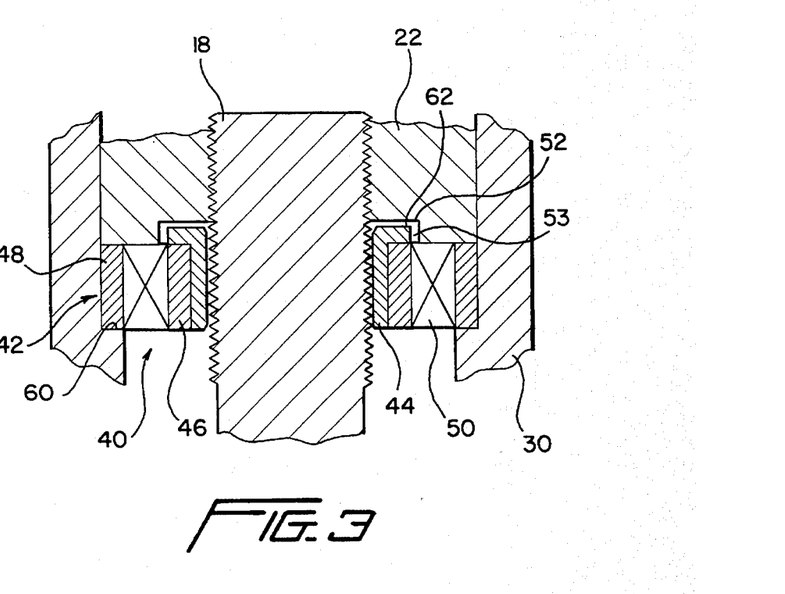
FIG. 3 is a fragmentary enlarged cross-sectional view of a stem and a stem nut, showing an alternative means for securing the bearing of FIG. 2.

Another means of securing the bearing assembly 40 to the stem nut 22 and drive sleeve 30 is disclosed in FIG. 3. The radial bearing 42 is press fit into the drive sleeve 30 against the shoulder 60. The stem nut 22 presses against the outer race 48 while maintaining gaps 52 and 53 from the axial bearing 44 and the inner race 46 such that the axial bearing 44 and the inner race 46 are stationary while the radial bearing 50 and the outer race 48 rotate with the stem nut 22 and the drive sleeve 30. The gaps 52 and 53 are contained within an annular slot 62 in the stem nut 22.

The axial bearing 44 may be integrated with the radial bearing 42. For example, the inner race 46 can provide the functions of the sleeve 45 of aligning the stem 18 within the stem nut 22 and allowing axial movement of the stem 18 relative to the inner race 46.

Figures 4, 5:
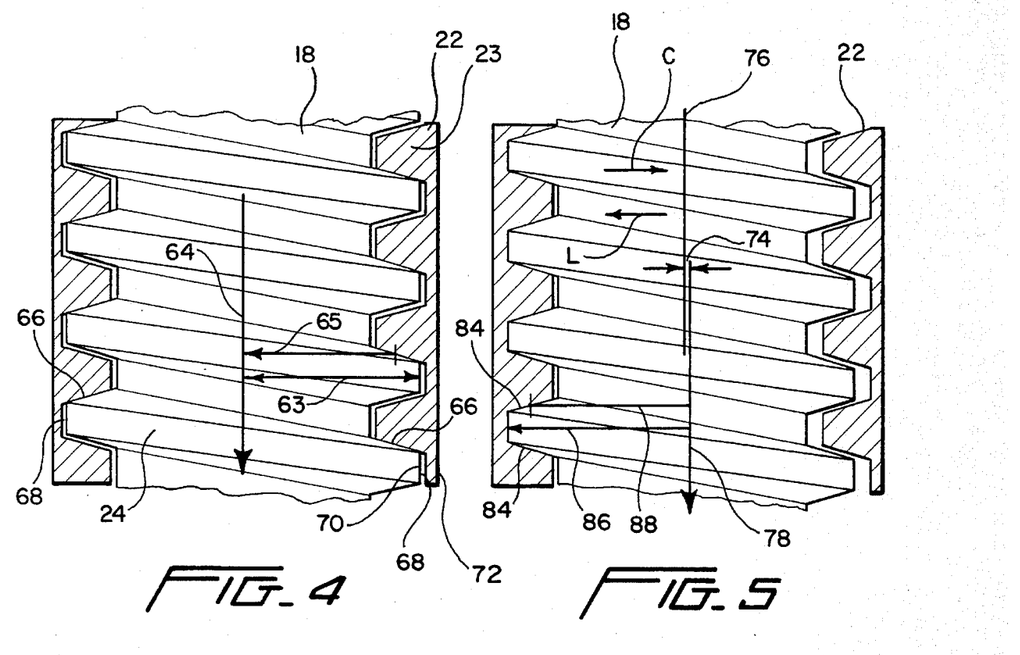
FIG. 4 is a fragmentary enlarged cross-sectional view of the stem and stem nut of the valve of FIG. 1, showing the alignment of the stem nut with the stem.
FIG. 5 is a fragmentary enlarged cross-sectional view of the stem and stem nut in a wedged misalignment.

The bearing assembly 40 advantageously aligns the stem 18 with the center of the stem nut 22, as best shown in FIG. 4. The stem external threads 24 and the stem nut internal threads 23 are typically Acme General Purpose threads 2G. The torque provided by the actuator 16 to the stem nut 22 is converted to thrust 64 to close the valve disk 8 against the process flow 4.

A measure of how much of the torque applied to the stem nut 22 is converted to thrust 64 is called stem factor. The stem factor is a function of the thread angle, stem lead, coefficient of friction between the materials, stem pitch and diameter. Distance 63 is equal to $0.05*D_1$, where $D_1$ is the nominal diameter of the stem 18. Distance 65 is $0.5*d_1$, where $d_1$ is the pitch diameter. The diameter and stem pitch are used to calculate the pitch diameter. The pitch diameter represents the equivalent diameter of the thread contact surface area through which the torque produces thrust. Some of the torque is not available for thrust production due to the causation of friction between the stem 18 and the stem nut 22 (sliding frictional loss). The equivalent moment arm of the thread surface area through which the torque of the stem nut 22 is converted to thrust is ½ the pitch diameter. When the axes of the stem 18 and the stem nut 22 are aligned, the actuator torque imparted to the stem nut 22 of a rising stem valve is accomplished by a "couple". The Acme thread configuration acts like an inclined plane, and as torque is applied, axial movement is produced in the stem 18, provided the stem 18 is not free to rotate with the stem nut 22. Therefore, all rising stem valves must have a device to prohibit rotation of the stem 18 and permit rotation of the stem nut 22 on the stem 18.

When the axis of the stem 18 and the stem nut 22 are aligned, the contact area 66 between the stem 18 and stem nut 22 would appear as the helical ribbon having a finite width. This results in an evenly distributed load delivered by the stem nut 22 to the stem 18. Gaps 68 are maintained between the crest 70 of the external threads 24 and the roots 72 of the internal threads 23 of the stem nut 22.

When the axis of the stem 18 and the nut 22 are aligned, the stem factor, SF, is given by the equation, $$\text{Stem Factor} = d * 1/[2(12 \text{ in/ft})] * [(\cos \alpha)(\tan a) + \mu] * 1/[\cos \alpha - (\mu) \tan a]$$

where
  d=Stem outside diameter minus p/2 (in.)
  p=Pitch (in.)=1/Threads per inch
  α=Half thread angle (degrees)
  a=Thread lead angle (degrees)
  tan a=L/(πd)
  L=Lead (in./rev.)

π=3.1416

μ=Thread friction coefficient (dimensionless)

The stem factor equation is valid only when the stem 18 is centered in the stem nut 22. When the stem 18 leaves the center of the stem nut 22, then the fixed diameter is also a variable. Thus, the present invention enables the valve R to behave in accordance with the stem factor equation. This then provides the user with some confidence that the valve R will perform similarly under static and dynamic condition consistently.

For an example of the impact of a change in the pitch diameter, consider a 1⅛ inch by ¼ pitch by ¼ lead Standard Acme 2G stem with its associated stem nut. The pitch diameter ($d_1$) of the 1⅛ inch stem is, $$d_1 = 1.125 - \text{pitch}/2 = 1.125 - 0.250/2 = 1.000 \text{ inch}$$

The effective moment arm is, $$0.05 * d_1 = 0.500 \text{ inch}.$$

Figure 6:
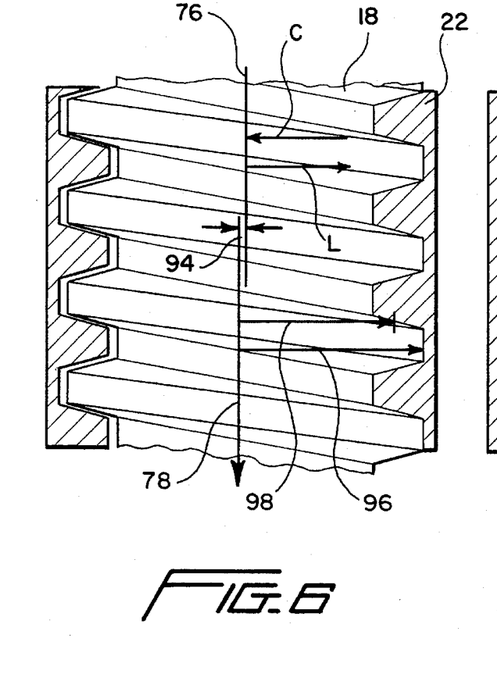
FIG. 6 is a fragmentary enlarged cross-sectional view of the stem and stem nut in a bottomed misalignment.

Suppose, the stem 18 is misaligned 0.010 inch off-center within the stem nut 22. If the packing and stem rejection leads are not great enough to re-center the stem and stem nut during the stroke, then the stem will ride off center in the stem nut, as best shown in FIGS. 5 and 6. The stem 18 and stem nut 22 make contact at one circumferential section (rather than throughout the circumference) which tends to increase the original moment arm $0.5*d_1$ and a pitch diameter $d_1$ in the stem factor equation. Now, at the contact location, the stem has an apparent radius use of 1.125/2+0.01 inch=0.5725 inch, and an apparent diameter of 1.145 inch. Therefore, the new pitch diameter is, $$d_2 = 1.145 - 0.250/2 = 1.020 \text{ inch}.$$

The new effective moment arm is, $$0.5 * d_2 = 0.510 \text{ inch}.$$

If all other variables in the equation are held constant, the stem factor increases 2.0%. Of course, this does not seem like a lot, but only the minimum clearance between the stem 18 and the stem nut 22 was assumed and the effects of wedging or bottoming of the threads have not been considered. Since the stem 18 and the stem nut 22 now contact each other at one circumferential location (for each thread of engagement), the bearing surface area is decreased and the stem/stem nut contact pressure increases (appreciably). This may have adverse effects on the lubricant and the coefficient of friction, further worsening the stem factor.

The largest radial clearance that could be expected for a new Acme Class 2G stem and stem nut, per Machinery's Handbook, could be as great as 0.02625 inch (0.0525 inch diametrical). The apparent diameter would be equal to the allowable diameter of the stem nut root, $$1.25 \text{ inch} + 0.020 \text{ inch (allowance)} + 0.02 \text{ inch (tolerance)} = 1.165 \text{ inch}.$$

The pitch diameter would then be, $$d_3 = 1.165 \text{ inch} - 0.250/2 = 1.040 \text{ inch}.$$

The new effective moment arm is, $$d_3 = 0.520 \text{ inch},$$

resulting in a stem factor increase of 4.0% for new parts.

The present invention maintains the stem 18 centered with the stem nut 22, thereby maintaining constant the pitch diameter which affects the stem factor.

The present invention further eliminates the effect of side loading to the stem 18 on the stem factor. Stem nut side loading, which is lateral loading that is perpendicular to the axis of the stem nut 22 can cause the stem 18 to be misaligned within the stem nut 22.

Figure 7:
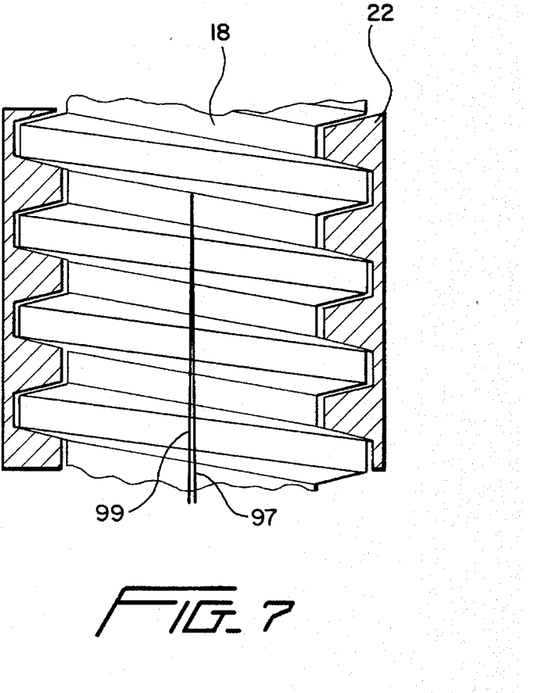
FIG. 7 is a fragmentary enlarged cross-sectional view of the stem and stem nut in a tilted misalignment.

The misalignment resulting from the stem nut side loading can result in the wedged configuration, a bottom configuration or a tilted configuration, as best shown in FIGS. 5, 6 and 7, respectively.

In the wedged configuration, disclosed in FIG. 5, the misalignment 74 between the center aligned 76 of the stem 18 and the center line 78 of the step nut 22 is caused by side load L, which then generates a centering force C in the opposite direction due to the Acme thread angle. The presence of the stem nut side loading L can affect the production of thrust from torque by interference in the threads. The calculated basic dimensions of the stem crest and the stem nut root are 0.0905 inch and 0.0875 inch, respectively. This suggests that if the axis of the stem 18 and the stem nut 22 are displaced by 0.01 inch, the stem threads could be wedged between the flanks 84 of the stem nut threads 23. This wedging condition is not accounted for in the stem factor formula and would worsen the torque production of thrust. The torque loss due to wedging is approximately, $$(0.5*d_2*\mu(L-C))/\text{Tan } 14.5° \text{ ft.lbs.}$$

where $0.5*d_2$ is the moment arm, μ is the coefficient of friction between the stem 18 and the stem nut 22, L is the stem nut side load in pounds, C is the centering force due to the Acme thread angle, and 14.5° is the thread half angle of the Acme General Purpose 2G thread. It should be noted that the contact pressure is very high and there may be adverse affects on the lubricant and coefficient of friction.

The distance 86 is $0.5*D_2$. The distance 88 is $0.5*d_2$. Comparing to the aligned configuration of FIG. 4, $D_2$ is $>D_1$, which follows that $d_2$ is $>d_1$ and that, therefore, Stem Factor$_2$ is >Stem Factor$_1$. Thus, the input torque is increased for the same amount of thrust output.

If sufficient thread clearance exists, the stem crest of the stem 18 could contact the nut root of the stem nut 22, causing a bottomed configuration disclosed in FIG. 6. This has the effect of moving (increasing) the pitch diameter outward towards the stem nut root. The side load L causes a centering force C due to the Acme thread angle. The misalignment 94 between the center line 76 of the stem 18 and the center line 78 of the stem nut 22 creates a larger distance 96 ($0.5*D_3$) and distance 98 ($0.5*d_3$) which are greater than the distances $0.5*D_1$ and $0.5*d^1$ for the aligned configuration of FIG. 4. Since $D_3$ is $>D_1$ which follows that $d_3$ is $>d_1$, then the Stem Factor$_3$>Stem Factor$_1$. The torque required from the actuator 16 is then increased for the same amount of output thrust. The torque loss due to bottoming is approximately, $$0.5*d_3*\mu*(L-C) \text{ ft. lbs.}$$

It is also possible that misalignment could cause tilting of the stem 18 within the stem nut 22, where the centerline 97 of the stem 18 is at an angle with the centerline 99 of the stem nut 22, as best shown in FIG. 7. This would produce point contact at two locations. This is a very severe condition which could result in binding and is difficult to describe mathematically.

Sources of misalignment in the MOV valve will now be described. Misalignment could come from the initial assembly of the valve or during operation of the valve. The present invention advantageously prevents or minimizes misalignment, which causes the valve to behave unpredictably under static and dynamic loads.

It would be very easy to produce misalignment of 0.010 inch when installing a new or rebuilt actuator with a new stem nut. For components that are worn due to use, the value would be higher. The greater the wear, the greater the clearances, the greater the potential of misalignment, the greater the potential increase in pitch diameter, the greater the potential contact pressure, and the greater the stem factor. Of course, once stem crest and nut root contact are made, bottoming or wedging, could occur which would result in additional torque usage.

The Acme thread descriptions in Machineries Handbook indicate that the minimum diametrical clearance for Acme General Purpose threads is 0.020 inch (the stem nut root is 0.02 inch larger in diameter than the nominal stem diameter). Considering that any given Acme General Purpose Class 2G stem/stem nut can have a minimum radial clearance (new) of only 0.010 inch (stem thread crest is stem nut root), it seems unlikely the technicians in the field can make a valve/actuator alignment with this kind of precision.

Initial misalignment created by the assembly of the components of the MOV could easily occur over the entire stroke of the valve, or only during the final closing of the valve.

If the actuator 16 is misaligned upon installation, the stem 18 may be off center in the stem nut 22, resulting in higher than expected stem factor. However, as the resistive axial load (compression or tension in the stem 18) increases, the re-centering force C will increase. When the axial thrust load becomes great, as in the case of seating the disk 6 and continuing towards torque switch trip, there could be a decrease in the stem factor (i.e., the increased resistive axial load re-centers the stem 18, which decreases the pitch diameter, decreases the contact pressure, and therefore decreases the stem factor). This appears as a high stem factor during the running portion of the stroke, which starts to decrease when the disk 8 hits the seat 10, and continues to decrease until the typical configuration and/or torque switch trip is achieved. This phenomena is termed negative load sensitive behavior. The thrust production becomes greater from a given torque as load increases.

Initial misalignment of the three major components of the valve R can occur as the disk 8 (either gate or globe) contacts the seat 10. The disk guide 36 may not be properly aligned with the seat 10 which results in binding (i.e., the stem/stem nut end packing which acts as a fulcrum, and final destination of the T-head connection 12 are not in alignment as the disk 8 contacts the seat). The thrust requirement would be increased, which will require more torque to produce the thrust, which will cause a greater torque in the stem 18. The stem 18 will rotate in the disk 8 and become locked. The end result would be the generation of a side load of the stem 18 on the stem nut 22 similar to the dynamic gate valve misalignment described below. This will cause a decrease in the thrust available at torque switch trip, or, positive load sensitive behavior.

If there is excessive clearance within the actuator thrust bearings (not shown), separation of the worm and worm gear (due to thread angel) can occur when loaded in cross lateral displacement of the drive sleeve 30. The drive sleeve 30 will then force the stem nut 22 into the stem 18. The effect is the same; the pitch diameter is increased, the thread contact pressure is increased, and the stem factor is increased.

During the running portion of the stroke, the inherent centering of the Acme thread (due to actual packing load and thread angle) may be greater than the separation effect of the worm and worm gear (not shown). When axial force in the stem 18 increases at the hard seat contact and the actuator torque output increases, separation may occur. This may impact torque delivered to the stem nut 22.

A source of dynamic misalignment in gate valves, such as that shown in FIG. 1, can occur under dynamic conditions which would produce load sensitive behavior. If the valve R has previously exhibited good initial alignment during static conditions, side loading during valve stroke under dynamic conditions can occur.

Figure 8:
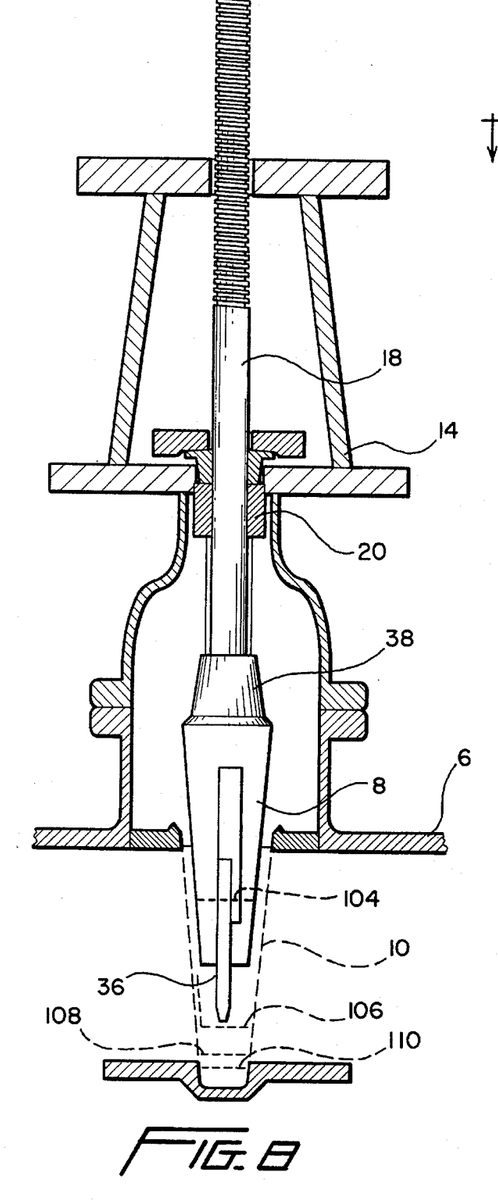
FIG. 8 is a side elevational view of a motor operated valve, with portions shown in cross-section, showing the various positions of the disk during closing.
Figures 9, 10:
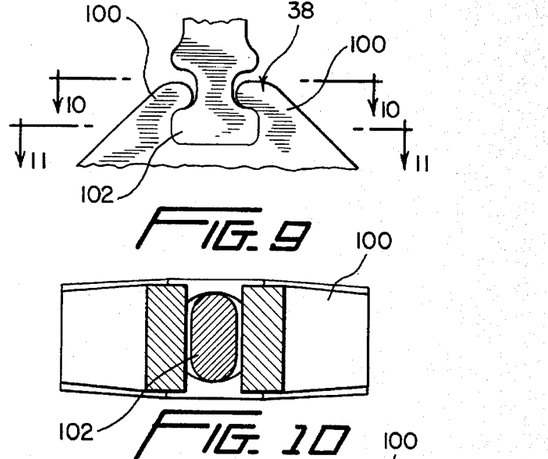
FIG. 9 is an enlarged fragmentary view of the connection between the stem and disk of the valve of FIG. 1.
FIGS. 10 and 11 are cross-sectional view taken along lines 10—10 and 11—11, respectively, of FIG. 9, showing the normal relative position of the stem with the disk.
Figures 11, 12:
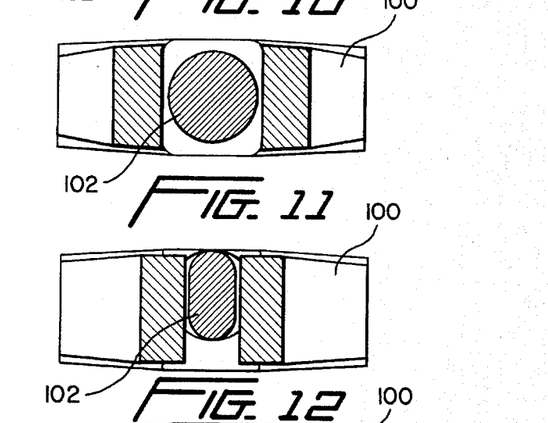
FIGS. 12 and 13 are cross-sectional views taken along lines 10—10 and 11—11 of FIG. 9, showing downstream sliding motion of the stem relative to the disk during dynamic closing of the valve of FIG. 8.
Figure 13:
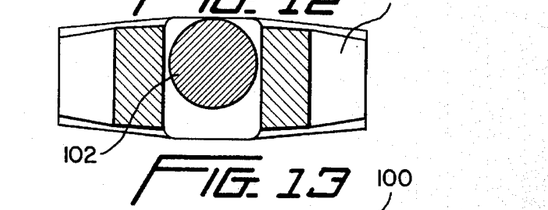
Figure 14:
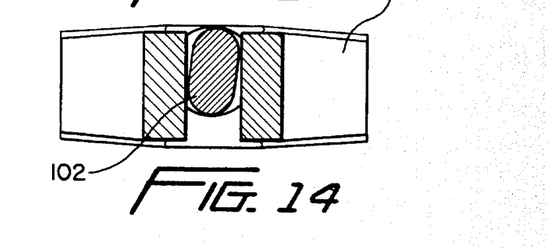
FIG. 14 is a cross-sectional view taken along line 10—10 of FIG. 9, showing rotation between the stem and the disk during dynamic closing of the valve of FIG. 8.

Typically, the gate valve R have disk ears 100 which are perpendicular to the process flow 4, as best shown in FIGS. 8 and 9. The disk ears 100 secure the T-head 102 at the sides rather than at the upstream and downstream faces. When the valve is opened, the disk 8 hangs from the T-head 102, as best shown in FIGS. 10 and 11. The starting position of the bottom end of the disk 8 is shown in dashed line at 104 when in the open position. During the initial stages of closure, the torque transmitted to the stem 18 is reacted by the packing 20. The entire disk 8 is pushed downstream against the guide 36 due to building differential pressure, as best shown in FIGS. 8, 12 and 13. The disk 8 easily slides on the T-head 102 in the direction of flow 4. Axial force continues to build in the stem 18 as the disk 8 enters the flow stream 4. When the disk 8 contacts the downstream seat 10, as generally indicated at 106, the downstream seat 10 assumes the load and the guide 36 is relieved. Increased thrust requirement causes increased T-head axial loading and stem torque reaction, causing the T-head to rotate and lock in place, as best shown in FIG. 14.

As the disk 8 continues toward closure, generally indicated at 108 and 110, the disk 8 is forced by the angle of the seat 10, sliding down an inclined plane. In essence, as the disk 8 closes, it must also move upstream due to the angle of the seat 10. However, the stem 18 is held to the disk 8 due to the coefficient of friction between the T-head 102 and the disk 8, and is also locked in place due to the transmission of torque from the stem nut 22, to the stem 18, to the disk 8 (torque reaction factor) and finally the valve body 6. This causes the T-head 102 to move upstream with the disk 8 and induces a lateral load in the stem 18 (which is proportional to the axial load) and/or the amount of the travel of the disk 8. The packing 20 acts as a fulcrum causing a lateral load reaction of the stem 18 and the stem nut 22 interface. This therefore causes stem nut side loading.

A free body diagram of the major components of the gate valve must show the sum of the moments and forces in the x, y, and z planes equal to 0. The torque in the stem 18 is generally transmitted to the disk 8 at the T-head connector 100. However, the packing 20 will usually react the torque until the torque becomes large enough to rotate the T-head 102. Since the disk 8 slides in the guide 36 that are attached to the valve body 6, the torque is then transmitted (reacted by) to the body 6. Hence, the torque applied by the actuator 16 is finally reacted by the valve body 6, back through the yoke 14 to the actuator 16 where it originated. The thrust produced by the stem nut 22 to close the disk 8 is reacted by the actuator 16 as it is firmly bolted to the valve. Any lateral load present at the T-head 102 will be reacted at the stem nut 22 at a relationship determined by the fulcrum and its relative location to the stem nut 22 and the T-head 102.

The lateral force will have a tendency to increase all the way to hard seat contact. The lateral movement of the disk 8 stops at hard seat contact. However, the lateral load will remain all the way to torque switch trip unless the stem 8 somehow relieves the lateral load by sliding (skipping or chattering) on the disk 8.

The above description is the chief root cause of load sensitive behavior observed in gate valves under dynamic conditions. Also, gate valves with disk ears 100 parallel to the flow stream can exhibit similar characteristics and variations.

In globe valves, the disk generally cannot impart torque to the valve body as it is usually free to rotate. In this case, the stem 18 may have a single axial slot 112 and is keyed to a bushing in the top of the valve yoke, shown schematically at 114. The slot 112 permits axial movements of the stem 18 while the torque is transmitted to the key 114 and finally reacted in the top of the valve yoke back to the actuator 16 where it originated. Another configuration is the torque reaction arm which is normal to the stem axis and projects through a slot in the yoke. The slot also permits axial movement of the stem 18 while the torque is transmitted to the torque arm through the yoke back to the actuator 16 where it originated. The balancing of moments and forces is much different than a gate valve due to the stem torque being reacted by a single moment arm (key 114) on the stem 18 rather than as a mechanical couple at the disk (the disk is guided through the body on both sides). Therefore, additional forces are required to bring the globe valve stem and stem nut to static equilibrium.

Figure 15:
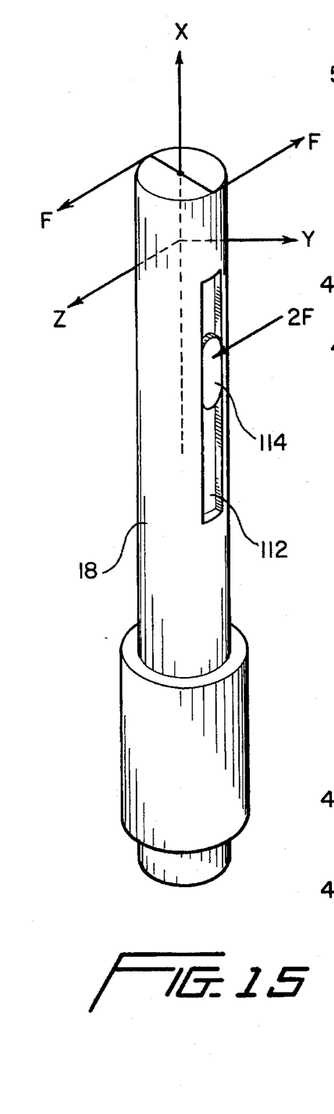

For brevity, the stem slot 112 and key 114 combination will be discussed. The yoke slot and torque arm combination behave in essentially the same manner. Additional force is required to bring the globe valve into equilibrium. FIG. 15 shows that the forces F on the z axis are unbalanced as a result of not reacting to torque in a couple. The 2F vector will be reacted through the stem to both the stem nut and packing (envision a simple beam problem). Since key configurations are closer to the stem axis and closer to the stem nut, two adverse things will occur: (a) the 2F vector will be larger because it is acting through a smaller moment arm; and (b) the stem nut side load will have a larger share of the reacted 2F force. This illustration clearly shows that a typical globe valve must have stem nut side loading in order to have the stem in static equilibrium. It is not however sufficient to describe why static and dynamic globe valve behavior is different.

In a static stroke, the running loads are generally low enough so that the packing can provide the torque reaction required to effect stem movement. Therefore, when hard seat contact is achieved, the 2F vector is zero and the stem is likely centered in the stem nut. In order to put stem nut side loading (2F reaction) to produce lateral movement of the stem after hard seat contact, it must be great enough to produce axial compression of the stem sufficient to climb the Acme thread angle. As a result the required reaction force is created quickly and before the stem can bottom or wedge in the stem nut. Conversely, in a dynamic stroke, the running loads become high as the disk approaches the seat. The torque reaction is then assumed by the key 114 or torque arm, and side loading is produced before hard seat contact, allowing the stem to move laterally and possibly causing bottoming or wedging.

If the initial and/or dynamic misalignment of the axis of the stem 18 and the stem nut 22, a small axial force exerted on the stem will naturally re-center the two components due to the Acme thread angle, provided that the stem has some flexibility or freedom to move. The centering force C perpendicular to the stem axis can be approximated by, $$C = \text{Thrust} * \mu * \tan 14.5°$$

where Thrust is the total thrust in the stem above the packing, $\mu$ is the coefficient of friction between the stem and stem nut, and the 14.5° is the thread half angle of an Acme General Purpose thread.

If the initial and/or dynamic misalignment is large or the stem is very rigid, the stem force required to re-center the two axes becomes greater. If the components cannot be re-centered by the force acting axially in the stem, then the components will continue to be misaligned while the stem is producing axial movement.

It is interesting to note that it is quite possible that the stem nut side loading force induced during closure can act in a direction which may relieve initial misalignment of the stem and the stem nut. The final effect would be to decrease the pitch diameter, decrease the contact pressure and thereby decrease the stem factor as the disk takes the seat. This helps to explain why identical motor operated valves can exhibit positive and negative load sensitive behavior. The answer may be that the initial installation misalignments were in the opposite directions. When subjected to dynamic load, the stem nut side loading generated relieves the misalignment and stem nut side loading on one motor operated valve (showing negative load sensitive behavior) while worsening the misalignment and stem nut side loading on the other motor operated valve (positive load sensitive behavior).

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:
1. A valve, comprising:
   a) a body for connecting to a pipe;
   b) said body having a passageway therethrough for communicating with the pipe;
   c) a member disposed within said passageway, said member being movable between open and closed positions for permitting and stopping flow through the pipe, respectively;
   e) a stem secured to said member;
   f) a nut operably secured to said stem, said nut being axially stationary relative to said stem and rotatable thereabout;
   g) an actuator for rotating said nut such that rotation of said nut causes said stem to move said member between said open and closed positions;
   h) a first bearing adapted to radially center said stem within said nut, said first bearing adapted to permit said stem to slide axially relative thereto;
   i) a second bearing operably associated with said first bearing adapted to reduce rotational friction between said nut and said stem;
   j) said nut including a recess at one end; and
   k) said first and second bearings are disposed within said recess and being in operative engagement with one another.

2. A valve as in claim 1, wherein:
a) said nut includes first and second ends; and
b) said first and second bearings are disposed at one of said first and second ends.

3. A valve as in claim 1, wherein:
a) said first bearing is a sleeve press fit into said second bearing.

4. A valve as in claim 3, wherein:
a) said sleeve includes an outwardly extending annular flange; and
b) said second bearing engages said flange.

5. A valve as in claim 4, wherein:
a) said second bearing is a roller bearing having inner and outer races; and
b) said outer race engages said flange.

6. A valve as in claim 5, wherein:
a) said sleeve and said inner race are non-rotational.

7. A valve as in claim 5, wherein:
a) said outer race engages said nut.

8. A valve as in claim 3, wherein:
a) said sleeve is made of bronze.

9. A device for centering a captive stem nut about a stem, comprising:
a) a first bearing adapted to radially center said stem within said nut, said first bearing adapted to permit said stem to slide axially relative thereto;
b) a second bearing operably associated with said first bearing adapted to reduce rotational friction between said nut and said stem;
c) said nut including a recess at one end; and
d) said first and second bearings are disposed within said recess and being in operative engagement with one another.

10. A valve as in claim 9, wherein:
a) said nut includes first and second ends; and
b) said first and second bearings are disposed at one of said first and second ends.

11. A valve as in claim 9, wherein:
a) said first bearing is a sleeve press fit into said second bearing.

12. A valve as in claim 11, wherein:
a) said sleeve includes an outwardly extending annular flange; and
b) said second bearing engages said flange.

13. A valve as in claim 12, wherein:
a) said second bearing is a roller bearing having inner and outer races; and
b) said outer race engages said flange.

14. A valve as in claim 13, wherein:
a) said sleeve and said inner race are non-rotational.

15. A valve as in claim 13, wherein:
a) said outer race engages said nut.

16. A valve, comprising:
a) a body for connecting to a pipe;
b) said body having a passageway therethrough for communicating with the pipe;
c) a member disposed within said passageway, said member being movable between open and closed positions for permitting and stopping flow through the pipe, respectively;
d) a stem secured to said member;
e) a nut operably secured to said stem, said nut being axially stationary relative to said stem and rotatable thereabout, said nut including a recess at one end;
f) an actuator for rotating said nut such that rotation of said nut causes said stem to move said member between said open and closed positions;
g) a roller bearing disposed within said recess, said bearing including an outer race, an inner race and rollers disposed therebetween, said outer race in press fit engagement within said recess said inner and outer race being in operative engagement with one another;
h) said inner race being adapted to radially center said stem within said nut within said recess, said inner race being adapted to permit said stem to slide axially relative thereto; and
i) said outer race being adapted to reduce rotational friction between said nut and said stem.

17. A valve, comprising:
a) a body for connecting to a pipe;
b) said body having a passageway therethrough for communicating with the pipe;
c) a member disposed within said passageway, said member being movable between open and closed positions for permitting and stopping flow through the pipe respectively;
d) a stem secured to said member;
e) a nut operably secured to said stem, said nut being axially stationary relative to said stem and rotatable thereabout, said nut having a first recess;
f) an actuator for rotating said nut such that rotation of said nut causes said stem to move said member between said open and closed positions, said actuator including a drive sleeve secured to said nut, said drive sleeve having a second recess;
g) a first bearing adapted to radially center said stem within said nut, said first bearing being adapted to permit said stem to slide axially relative thereto and being disposed within said first recess; and
h) a second bearing operably in engagement with said first bearing, said second bearing being adapted to reduce rotational friction between said nut and said stem, and said second bearing being disposed within said second recess.

* * * * *